(12) United States Patent
Veis et al.

(10) Patent No.: US 9,266,224 B2
(45) Date of Patent: Feb. 23, 2016

(54) VACUUM HOLE ARRAY

(75) Inventors: Alex Veis, Netanya (IL); Yuval Dim, Tel Aviv (IL)

(73) Assignee: Hewlett-Packard Industrial Printing Ltd, Netanya (IL)

( * ) Notice: Subject to any disclaimer, the term of this patent is extended or adjusted under 35 U.S.C. 154(b) by 0 days.

(21) Appl. No.: 14/408,491

(22) PCT Filed: Jun. 25, 2012

(86) PCT No.: PCT/IL2012/050220
§ 371 (c)(1),
(2), (4) Date: Dec. 16, 2014

(87) PCT Pub. No.: WO2014/002080
PCT Pub. Date: Jan. 3, 2014

(65) Prior Publication Data
US 2015/0151411 A1    Jun. 4, 2015

(51) Int. Cl.
*B41J 2/01* (2006.01)
*B25B 11/00* (2006.01)
*B41J 11/00* (2006.01)
*B41J 11/06* (2006.01)
*B41J 13/22* (2006.01)
*F16M 11/04* (2006.01)
*F16M 13/00* (2006.01)
*B41J 11/08* (2006.01)

(52) U.S. Cl.
CPC ........... *B25B 11/005* (2013.01); *B41J 11/0085* (2013.01); *B41J 11/06* (2013.01); *B41J 13/226* (2013.01); *F16M 11/041* (2013.01); *F16M 13/00* (2013.01); *B41J 11/08* (2013.01)

(58) Field of Classification Search
CPC ..................................................... B41J 11/0085
See application file for complete search history.

(56) References Cited

U.S. PATENT DOCUMENTS

| 8,066,283 | B2 | 11/2011 | Yamada |
| 2008/0012931 | A1 | 1/2008 | Gros et al. |
| 2009/0295894 | A1* | 12/2009 | Hori .............................. 347/102 |
| 2010/0238249 | A1* | 9/2010 | Panides et al. ................ 347/104 |
| 2011/0025796 | A1 | 2/2011 | Matsuya |
| 2011/0074872 | A1 | 3/2011 | Ozaki et al. |
| 2011/0292145 | A1 | 12/2011 | Hoover et al. |

FOREIGN PATENT DOCUMENTS

JP          2011167926 A      9/2011

OTHER PUBLICATIONS

International Search Report Apr. 8, 2013 issued on International Application No. PCT/IL2012/050220 dated Jun. 25, 2012, European Patent Office.

* cited by examiner

*Primary Examiner* — Lisa M Solomon
(74) *Attorney, Agent, or Firm* — HP Inc Patent Department

(57) ABSTRACT

A vacuum hole array including a dense array of vacuum holes and a sparse array of vacuum holes.

14 Claims, 5 Drawing Sheets

US 9,266,224 B2

VACUUM HOLE ARRAY

CLAIM FOR PRIORITY

The present application is a national stage filing under 35 U.S.C 371 of PCT application number PCT/IL2012/050220, having an international filing date of Jun. 25, 2012, the disclosure of which is hereby incorporated by reference in its entirety.

BACKGROUND

Media supports can be provided with vacuum holes to hold the media in position against the support. Large format media supports are arranged to support large format media. Large format media supports are provided with relatively large surface areas. Consequently the media support is provided with a high number of vacuum holes. Relatively heavy duty pumps are connected to the holes to provide for a sufficient vacuum force for all these holes, so as to be able to hold large format media in place.

BRIEF DESCRIPTION OF THE DRAWINGS

For the purpose of illustration, certain examples constructed in accordance with the teachings of this disclosure will now be described with reference to the accompanying drawings, in which.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that examples or elements that are not literally described may be derived from the description and drawings by a person of ordinary skill in the art.

This disclosure discloses vacuum hole arrays. In certain examples, these vacuum hole arrays are provided in media supports. For examples, a media support includes a platen, table or drum for supporting media. For example, the vacuum holes are arranged in constant patterns, having constant pitches. In this disclosure examples are described wherein a dense array and a sparse array have different constant pitches. In this disclosure a dense pitch and a sparse pitch are described, wherein the dense pitch refers to a higher frequency of hole placement and a sparse pitch refers to a lower frequency of hole placement.

For example, the media support is capable of supporting large format print media. In an example large format media refers to media that has a minimum length or width of approximately 594 millimeters. For example, media is arranged to receive a fluid such as an imaging liquid such as ink. For example the media includes at least one of paper, cotton, vinyl, polymers or any other suitable print media. For example the vacuum hole array is arranged to retain the media flat and in position against the media support. In different examples, the vacuum hole array has different hole sizes. For example, vacuum hole arrays adapted for flexible media have smaller holes than vacuum hole arrays adapted for stiffer media. In an example, the vacuum hole array is arranged to support any media format, for example large and normal and small format media.

Figure 1:
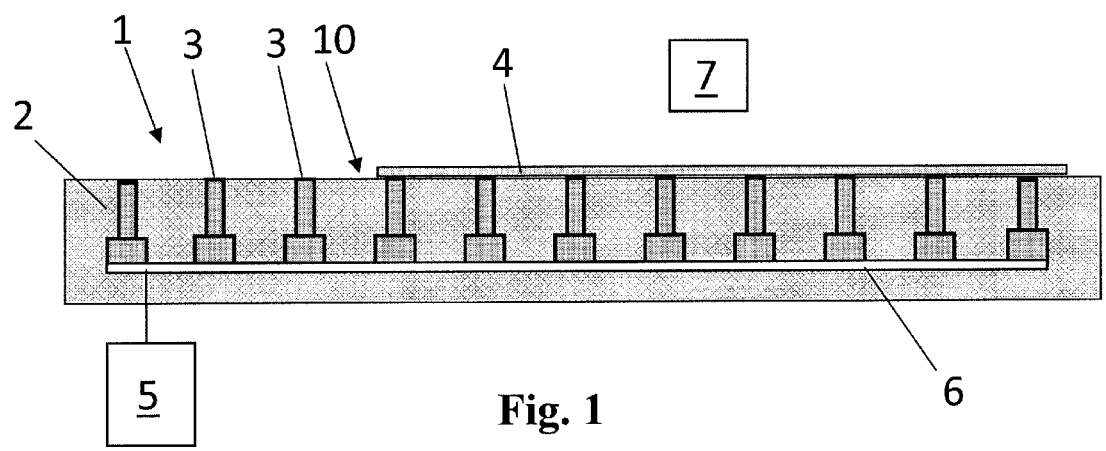
FIG. 1 illustrates a diagram of an example of a media support in a cross sectional side view.

FIG. 1 illustrates a diagram of an example of a media support 1 in cross sectional side view. The media support 1 includes a table 2. The table 2 includes an array 10 of similarly sized vacuum holes 3. Media 4 is positioned onto the media support 1, covering at least a portion of the vacuum hole array 10. A pump 5 is fluidically connected to the vacuum holes 3, for example through gas channels 6. The vacuum holes 3 are connected to one and the same vacuum pump 5. For example, the pump 5 is arranged to operate with an air flow rate of approximately 900 Cubic Feet per Minute (CFM) or less, or approximately 400 Cubic Feet per Minute or less. For example a fluid dispense head 7 is provided near the media support 1 for dispensing fluid onto the media 4, for example above the table 2.

In an example scenario, media 4 is correctly positioned onto the media support 1 before starting a fluid dispensing process. Once correctly positioned, the pump 5 is activated, creating vacuum in the holes 3 so that the media 4 is held against the media support 1. The vacuum force retains the media 4 during dispensing of fluid onto the media 4. For example, the fluid dispense head 7 or the media support 1 is moved for passing the media 4 with respect to the fluid dispense head 7 during or between dispensing.

Figure 2:
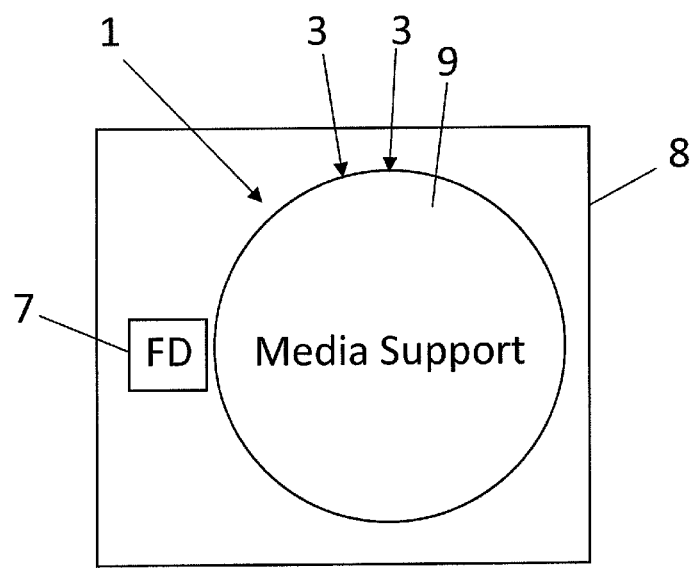
FIG. 2 illustrates a diagram of a cross sectional side view of an example of a fluid dispenser.

FIG. 2 illustrates a diagram of an example of a fluid dispenser 8 in cross sectional side view. Here, the media support 1 is a drum 9. In operation, media 4 is loaded to the drum 9 while vacuum holes 3 in the surface of the drum 9 apply a vacuum force to the media 4. For example in operation the fluid dispenser 7 remains static while the drum 9 rotates to pass the media 4 along the fluid dispenser 7. Furthermore a pump 5 (not illustrated here) is provided to apply the vacuum to the vacuum holes 3. For example the fluid dispenser 7 includes a page wide fluid dispenser array.

Figure 3:
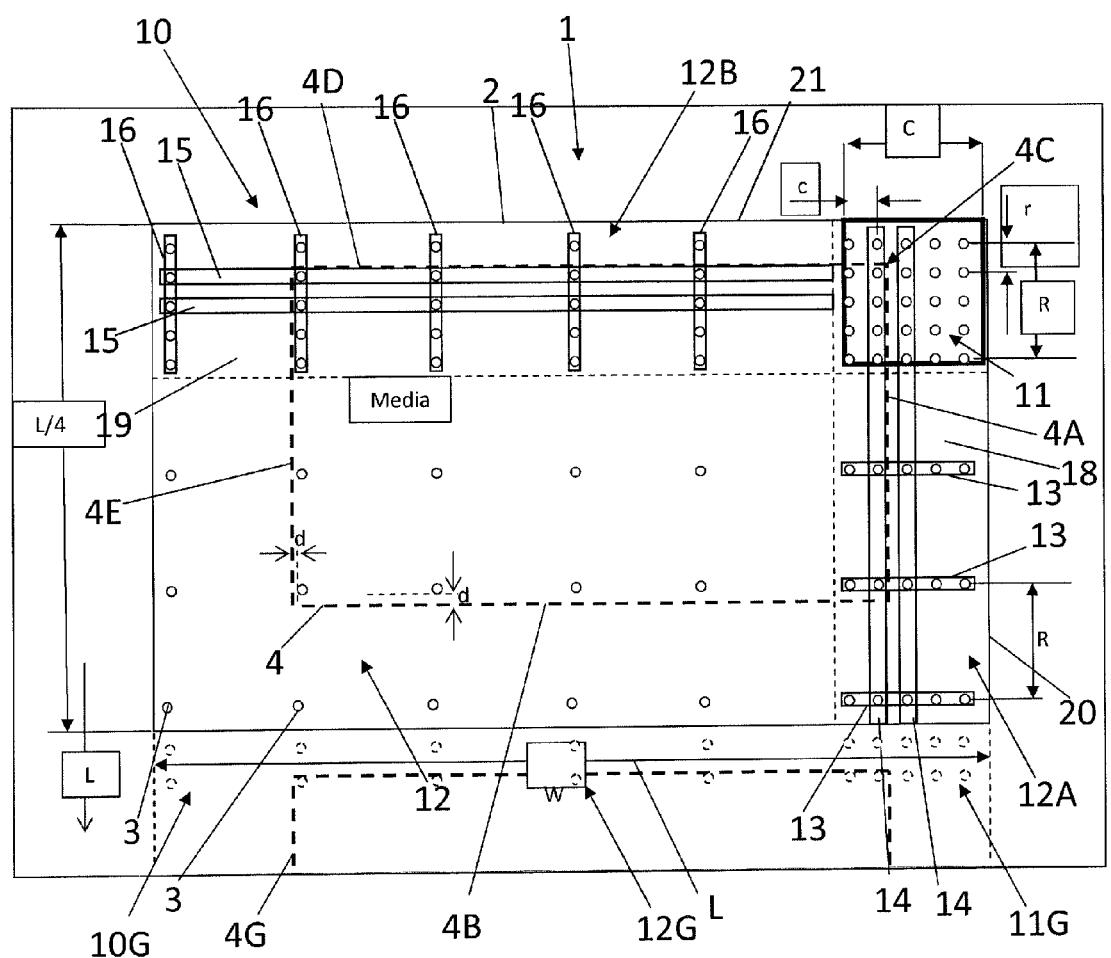
FIG. 3 illustrates a diagram of an example of a top view of a vacuum hole array.

FIG. 3 illustrates a top view of an example vacuum hole array 10 and in a further example represents a quarter portion of a media support 1. In this example, only a quarter's length L/4 of the media support 1 is illustrated and a full width W. For example, the illustrated vacuum hole array 10 is repeated four times along a full length L of the media support 1, for example for placing multiple media 4, 4G. To illustrate this, part of a second vacuum hole array 10G and a second media 4G are shown. In the vacuum hole array 10, substantially all of the vacuum holes 3 of the vacuum hole array 10 are of the same size and can be connected to the same vacuum pump 5. Examples of vacuum holes 3 have diameters in a range of approximately 2 to 15 millimeters.

The example vacuum hole array 10 includes a dense array 11 of vacuum holes 3 having a constant, dense pitch c, r. For example, the dense pitch r, c of the rows and columns of the dense array 11 is between approximately 15 and approximately 80 millimeters, or between approximately 20 and approximately 55 millimeters, or between approximately 30 and 40 millimeters. Further illustrative example dense pitches r, c can be 30, 32, 33, 35 or 40 millimeters. For example, part of a second vacuum hole array 10G is illustrated that includes a similar dense array 11G, and has the same pitch r, c as the first dense array 11.

For example, the vacuum hole array 10 includes a sparse array 12 of vacuum holes 3 that are relatively sparsely distributed and that have a sparse pitch C, R. For example, the pitch R, C of at least one of the rows and columns of the sparse array 11 is between approximately 50 and approximately 220 millimeters, or between approximately 80 and approximately 180 millimeters, or between approximately 100 and 170 millimeters. For example, the illustrated sparse pitch C, R is between approximately 120 and 160 millimeter, such as for example approximately 120, 128, 132 or 140 millimeters. For example, the sparse pitch C, R corresponds to a desired minimum media width. For example, the second vacuum hole array 10G includes a another, similar sparse array 12G, illustrated in part, having the same pitch R, C as the first sparse array 12.

The vacuum hole array 10 includes different hole distributions because of the different pitches and can therefore be described as an unevenly distributed vacuum hole array 10. For example, the media support 1 includes multiple unevenly distributed vacuum hole arrays 10 that each include dense and sparse arrays 11, 12.

For example, pitches c, r, C, R between vacuum holes 3 are measured between central axes of the vacuum holes 3. In the illustrated array 10, rows are arranged in a width direction and columns in a length direction. For example, the pitch R, C of the sparse array 12 is approximately equal to the pitch r, c of the dense array 11 multiplied by an integer n such as two, three, four, five or higher. For example $R=n_r*r$, and $C=n_c*c$, wherein $n_r$ and $n_c$ are integers.

For example, $c=r=35$ mm, and $n=n_r=n_c=4$, so that $C=R=140$ mm. For example, the sparse pitch C, R is four times the dense pitch c, r in at least one of two perpendicular directions.

In one example, multiple sparse sub-arrays 12, 12A, 12B are provided. For example, a first sparse array 12 includes sparsely arranged rows and columns. For example, a second sparse array 12A includes sparsely distributed rows 13 and densely distributed columns 14 (big steps between subsequent rows 13 and small steps between subsequent columns 14). For example, a third sparse array 12B includes densely distributed rows 15 and sparsely distributed columns 16. For example, a first strip 18 that extends along the length L of the vacuum hole array 10, includes the dense array 11 and the second sparse array 12A. For example the first strip 18 extends close and parallel to a first edge 20 of the media support 1. A second strip 19 includes the dense array 11 and the third sparse array 12B. For example, the second strip 19 extends close and parallel to a second edge 21 of the media support 1. For example, the second edge 21 extends perpendicular to the first edge 20.

For example, the illustrated media support 1 can be divided into a first zone of the dense arrays 11 of vacuum holes 3 and a second zone of the sparse arrays 12, 12A, 12B of vacuum holes 3, wherein the second zone covers more surface of the media support 1 than the first zone. Only a small portion of the surface of the media support 1 has a dense array 11 so that a number of vacuum holes 3 in the media support 1 is reduced as compared to a media support that would only have dense arrays (not shown).

In operation, media 4 is placed onto the media support 1. For example, the media 4 is positioned so that a portion of a first media edge 4A extends in the dense array 11 and another portion of another media edge 4B extends in the sparse array 12. For example, the media 4 is positioned so that the distance d between each media edge 4A, 4B and the nearest vacuum hole 3 is less than the pitch c, r of the dense array 11. For example, first the media 4 is placed onto the media support 1 so that a media origin 4C extends in the dense array 11. Then the media 4 is repositioned until all edges 4A, 4B, 4D, 4E are within said distance d from respective nearest vacuum holes 3. The media origin 4C can be displaced within the dense array 11 until one of the media edge portions 4B, 4E in the sparse array 12 extends within said distance d from the respective vacuum holes 3. As a consequence the position of the media origin 4C with respect to the dense array 11 is dependent of the media size. For example, the maximum distance d can be approximately 40 millimeter or less, or approximately 30 millimeter or less, or approximately 20 millimeter or less, or approximately 15 millimeter, dependent of the chosen dense pitch r, c. For example, placing a media edge 4A, 4B, 4D, 4E near a vacuum hole 3, within said distance d, prevents curling or displacement of a respective media portion. In further examples, the media 4 is placed so that edges 4A, 4B, 4D, 4E extends approximately parallel to respective rows and columns of vacuum holes 3.

For example, the full media support 1 has a width W of 1600 millimeters and a length of 3200 millimeters, which is a total surface area of 5.12 square meters. For example one vacuum hole array 10 is provided per quarter's length L/4 of 800 millimeters and the media support 1 includes four equal vacuum hole arrays 10. Other not illustrated examples of media supports can contain different numbers of vacuum hole arrays 10. For example the dense pitch r, c is 35 millimeter, the sparse pitch R, C is 140 millimeter and the integer n is 4. For example, a distance of outer vacuum holes 3 to a respective one of the edges of the media support 1 is 16 millimeters. For example all rows have equal numbers of vacuum holes 3, as illustrated in FIG. 3. A total number of rows for such media support 1 can be calculated as follows.

$$((((L-32)/C)+1)+((n-1) \times 4)=35.63=35 \text{ rows.}$$

For example each row has the following amount of vacuum holes 3, being the same as the amount of vacuum columns.

$$(((W-32)/R)+1)+(n-1)=15.2=15.$$

Therefore, the example media support 1 of FIG. 3 would have 15×35=525 vacuum holes 3 over its total surface of 5.12 square meters which leads to an average distribution of approximately 100 vacuum holes per square meter. Conventional media supports have dense distributions only, with dense pitches c, r only over the entire media support 1. Such conventional media support with equal outer dimensions of 3200×1600 millimeters and equal dense pitch would contain approximately 45 (columns)×91 (rows)=4095 vacuum holes, or an average distribution of approximately 800 vacuum holes per square meter. The disclosed example vacuum hole array 10 including the sparse arrays 12, 12A, 12B has less vacuum holes 3 per square meter on average than conventional vacuum hole arrays with uniform distributions only.

Other examples of vacuum hole arrays 10 can include sparse less or more densely arranged holes, for example the number of subsequent rows and/or columns in the dense arrays 11 is higher, or for example the integer n is less or more than 4, or for example the pitches c, r, C, K are less or more. In different examples the average amount of vacuum holes per square meter is equal to or less than approximately 600, or equal to or less than approximately 400, or equal to or less than approximately 300, or equal to or less than approximately 200, or equal to or less than approximately 150. Having the unevenly distributed vacuum hole arrays 10 including sparse arrays 12, 12A, 12B reduces the total amount of vacuum holes 3 in the media support 1, while keeping the possibility of placing respective media edges 4A, 4B, 4D, 4E near vacuum holes 3. Vacuum pumps 5 can work more efficiently since less vacuum holes 3 will remain open during use. For example, less power or smaller pumps can be applied.

Figure 4:
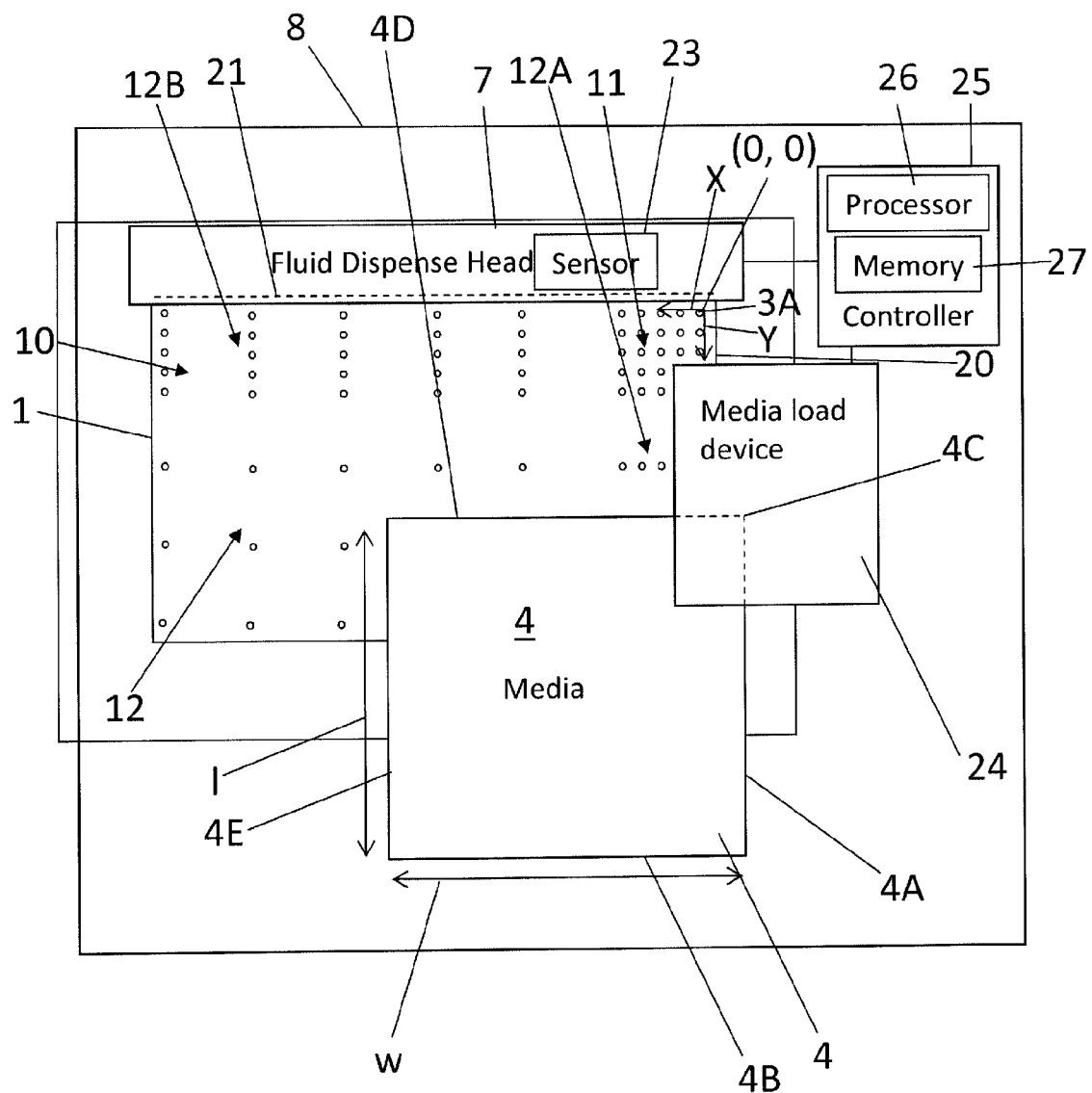
FIG. 4 illustrates a diagram of a top view of an example of a fluid dispenser.

FIG. 4 illustrates an example of a fluid dispenser 8 including a media support 1 with unevenly distributed vacuum hole array 10. In an example the fluid dispenser 8 is arranged as a large format inkjet flatbed printer. For example, the fluid dispenser 8 includes a fluid dispense head 7. For example, the fluid dispenser 8 includes at least one sensor 23. For example, the sensor 23 includes an optical sensor such as CCD or CMOS arranged to capture a media position with respect to the media support 1. For example the sensor 23 is arranged to capture a position of the media origin 4C, for example with respect to an origin (0, 0) of the vacuum hole array 10. In an example the sensor 23 is also arranged to capture imaging material deposited on the media 4. For example, the fluid dispenser 8 further includes a media load device 24 to load the media 4 onto the media support 1. For example, the media load device 24 includes wheels such as gripper wheels or rollers, vacuum suction elements, grippers or any other suitable loading device for positioning the media 4 with respect to the media support 1.

For example, the fluid dispenser 8 includes a controller 25. For example, the controller 25 includes a processor 26 and a memory 27. For example, the controller 25 includes digital and analogue application specific integrated circuits for controlling operations of the media load device 24 and the fluid dispense head 7, and for receiving signals of the sensor 23. For example, the controller 25 includes a formatter or RIP for image processing. For example, the controller 25 is configured to instruct the media load device 24 to place at least a portion of one of the media edges 4A, 4D over the dense array 11, and place at least a portion of another media edge 4B, 4D of the same media 4 over the sparse array 12 so that the distance d between each media edge 4A, 4B, 4D, 4E and the nearest vacuum hole 3 is less than the pitch r, c of the dense array 11 (as illustrated in FIG. 3).

For example, the controller 25 is configured to instruct the media load device 24 to place the media origin 4C in the dense array 11, for example the dense array 11 that is near the media support's edges 20, 21. For example, the controller 25 is configured to identify a total media width and length w, l, for example as stored, input or detected. For example, the controller 23 is configured to receive media position signals from the sensor 23. For example, the controller 25 is configured to determine a position of the media 4 with respect to a fictional X and Y axis, wherein the origin (0, 0) of the axes X, Y is located against the hole 3A of the outer corner of the outer dense array 11, in the drawing this is above and to the right of the top right hole 3A. The X and Y axis are arranged approximately parallel to the respective media support edges 21, 20. For example the X and Y axis are arranged just besides the hole so that the axes X, Y intersect the respective edges of the hole 3A. For example the controller 25 is configured to determine the optimal position of the media origin 4C with respect to the vacuum hole array origin (0, 0) so that the distance d between each media edge 4A, 4B, 4D, 4E and the nearest vacuum hole 3 is less than the pitch r, c of the dense array 11. For example the controller 25 is configured to instruct the media load device 24 to place the media origin 4C so that the distance d between each media edge 4A, 4B, 4D, 4E and the nearest vacuum hole 3 is less than the pitch r, c of the dense array 11. For example, the controller 25 calculates the media origin 4C in X by $$4Cx = \sim (fp(w/C))*C,$$

wherein fp is a fraction portion. For example if the sparse column width C is 50 millimeter, and the media width w is 80, the X position of the media origin 4C could be approximately (fp (80/50))*50 or (fp (1,6))*50. The fraction portion fp of 1,6 is 0,6 so that the X position of the media origin 4C with respect to the origin (0, 0) of the vacuum hole array 10 should be 0,6*50=30 millimeter. Likewise a calculation for the length l and Y position of the media origin 4C can be calculated. Amongst others, this example illustrates that the position of the media origin 4C with respect to the vacuum hole array origin (0, 0) is dependent of the media size w, l.

Figure 5:
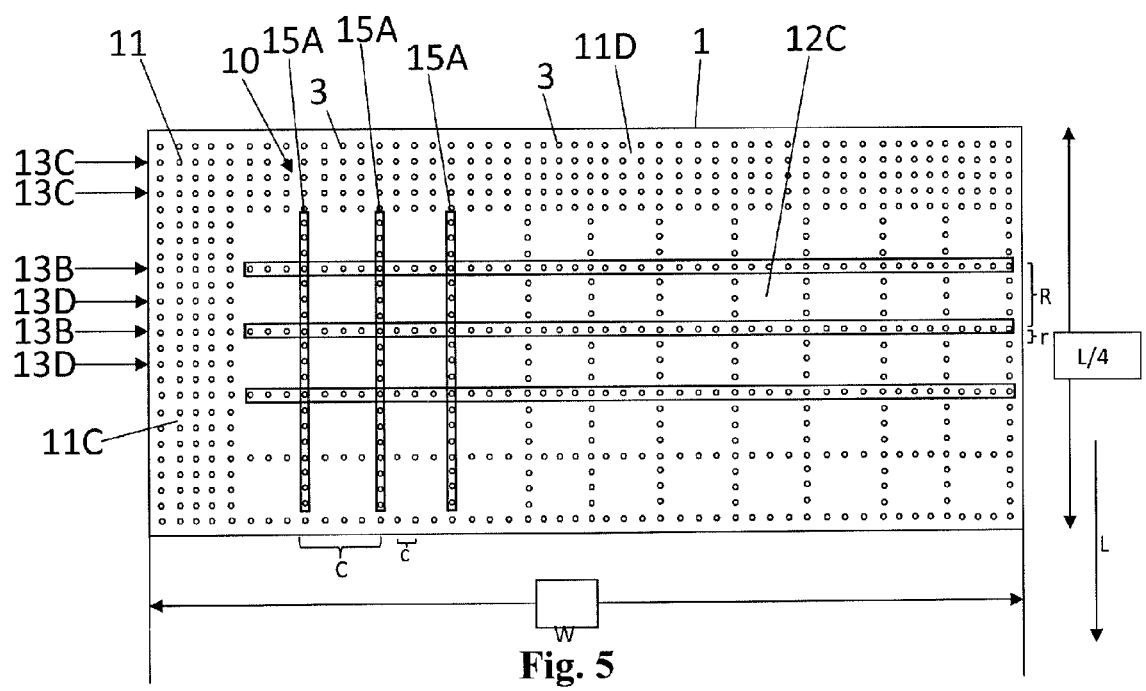
FIG. 5 illustrates a diagram of a top view of another example of a vacuum hole array.

FIG. 5 illustrates another diagrammatic example of a vacuum hole array 10. For example again only a quarter portion of the media support 1 is illustrated. The vacuum hole array 10 includes a dense array 11. For example, the vacuum hole array 10 includes a third strip 11C that includes the dense array 11 and that extends parallel to the length direction of the media support 1, and a fourth strip 11D that includes the dense array 11 and that extends parallel to a width direction W. As illustrated, the two dense strips 11C, 11D form an L-shaped dense array 11. For example, the vacuum hole array 10 includes a sparse array 12C. For example the sparse array 12C includes sparsely distributed columns 15A having a sparse pitch C, and sparsely distributed rows 13A having a sparse pitch R. For example, each of the sparsely distributed columns 15A and rows 13A contain densely distributed vacuum holes 3 having respective dense pitches c, r. For example, the media support 1 can divided into a first zone of the dense arrays 11, 11C, 11D and a second zone of the sparse arrays 12C of vacuum holes 3, wherein the second zone covers more surface of the media support 1 than the first zone.

In this example, the dense pitches r, c could be 32 millimeter and the integer n could be 4. For example, the total of vacuum holes 3 for the example media support 1 of FIG. 5 could be 3200×1600 mm is 2860 vacuum holes 3. This leads to an average vacuum hole distribution over the entire media support 1 of approximately 560 vacuum holes per square meter.

Figure 6:
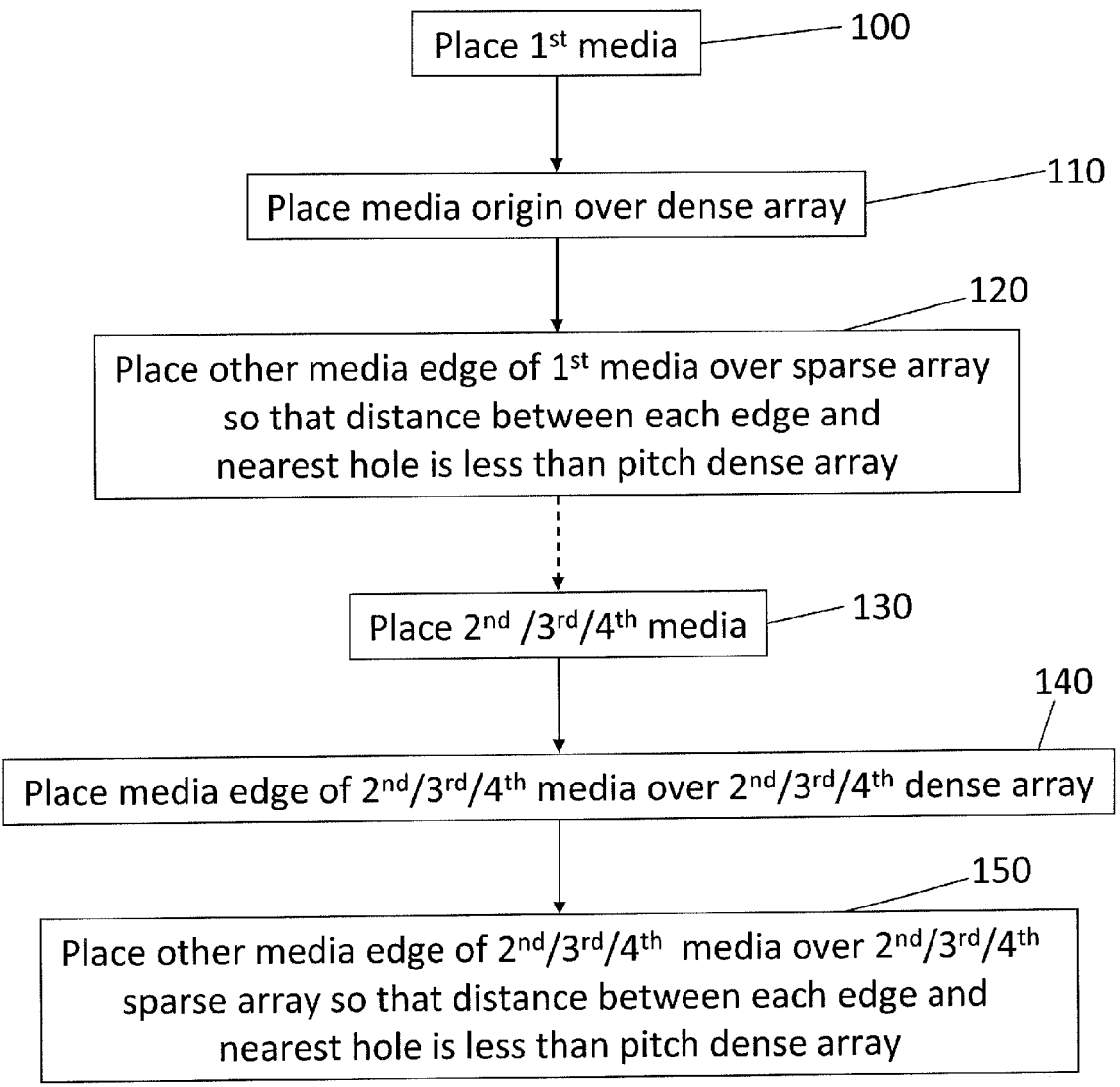
FIG. 6 illustrates a flow chart of an example of a method of placing media on a media support.

FIG. 6 illustrates a flow chart of an example of a method of placing media 4 on the media support 1. For example, the method includes placing the media 4 on the media support 1 (block 100). For example, the method includes placing the media origin 4C over the first dense array 11 (block 110), for example manually or by a media load device 24. For example, the method includes placing at least a portion of an opposite media edge 4B, 4E of the same media 4 over the first sparse array 12 so that the distance d between each media edge 4B, 4E and the nearest vacuum hole 3 is less than the pitch r, c of the first dense array 11 (block 120). For example, in the same block 120 the media origin 4C is displaced within the dense array 11 until all edges 4A, 4B, 4D, 4E extend over and close to the respective vacuum holes 3. Having the media edges 4A, 4B, 4D, 4E near a vacuum hole 3 prevents curling, wrinkling or unwanted displacement near a media edge 4A, 4B, 4D, 4E. For example, the method includes placing a second media 4G at a distance from the first media 4 (block 130). For example, the method includes placing the second media 4G over another dense array 11G having the same pitch r, c as said first dense array 11 and another sparse array 12G having the same pitch as said first sparse array 12 so that the distance d between each second media edge 4G and the nearest vacuum hole 3 is less than the pitch r, c of the said other dense array 12G. In a further example, third or fourth media can be placed on the media support 1 in the same manner.

The above description is not intended to be exhaustive or to limit this disclosure to the examples disclosed. Other variations to the disclosed examples can be understood and effected by those of ordinary skill in the art from a study of the drawings, the disclosure, and the claims. The indefinite article "a" or "an" does not exclude a plurality, while a reference to a certain number of elements does not exclude the possibility of having more or less elements. A single unit may fulfil the functions of several items recited in the disclosure, and vice versa several items may fulfil the function of one unit. Multiple alternatives, equivalents, variations and combinations may be made without departing from the scope of this disclosure.

The invention claimed is:

1. A fluid dispenser comprising
   a media support comprising a vacuum hole array having a dense array of vacuum holes and a sparse array of vacuum holes, a pitch of the sparse array being equal to a pitch of the dense array multiplied by two or a higher integer,
   a media load device to load media onto the media support,
   a controller to instruct the media load device to
      place an origin of an edge of the media over the dense array of vacuum holes, and
      place at least a portion of another edge of the media over the sparse array so that the distance between each media edge and the nearest vacuum hole is less than the pitch of the dense array.

2. The fluid dispenser of claim 1, wherein the pitch of the sparse array is at least approximately three times the pitch of the dense array.

3. The fluid dispenser of claim 1, wherein the sparse array has a pitch of between approximately 50 and 220 millimeters.

4. The vacuum hole array fluid dispenser of claim 1, wherein the dense array has a pitch of between approximately 15 millimeters and 80 millimeters.

5. The fluid dispenser of claim 1, wherein the vacuum holes in the dense array and the vacuum holes in the sparse array are of the same size with respect to each other.

6. The fluid dispenser of claim 1, wherein the vacuum holes in the dense array and the vacuum holes in the sparse array are connected to the same vacuum pump.

7. The fluid dispenser of claim 1, wherein the vacuum hole array comprises
   a first sparse array including sparsely distributed rows and columns of vacuum holes, and
   a second sparse array including sparsely distributed rows or sparsely distributed columns of vacuum holes, and wherein the dense array includes densely distributed rows and densely distributed columns.

8. A method of placing media on a media support, the media support including a first dense array of vacuum holes and a first sparse array of vacuum holes, the hole pitch of the first sparse array being at least approximately two times the pitch of the first dense array, the method including
   placing an origin of a media over the first dense array, and
   placing at least a portion of a media edge of the same media over the first sparse array so that the distance between each media edge and the nearest vacuum hole is less than the pitch of the first dense array.

9. The method of claim 8 comprising placing, in the same manner, a second media at a distance from the first media, over another dense array having the same pitch as said first dense array and another sparse array having the same pitch as said first sparse array so that the distance between each second media edge and the nearest vacuum hole is less than the pitch of the other dense array.

10. The method of claim 8, wherein the hole pitch of the first sparse array is at least approximately three times the hole pitch of the first dense array.

11. The method of claim 8, wherein the first sparse array has a hole pitch of between approximately 50 and 220 millimeters.

12. The method of claim 8, wherein the first dense array has a hole pitch of between approximately 15 millimeters and 80 millimeters.

13. The method of claim 8, wherein the vacuum holes in the first dense array and the vacuum holes in the first sparse array are of the same size with respect to each other.

14. The method of claim 8, wherein the vacuum holes in the first dense array and the vacuum holes in the first sparse array are connected to the same vacuum pump.

* * * * *